(12) United States Patent
Shu et al.

(10) Patent No.: US 10,801,324 B2
(45) Date of Patent: Oct. 13, 2020

(54) DOUBLE-WORKING-MEDIUM EXPANDER USED FOR TWO-STAGE ORGANIC RANKINE CYCLE

(71) Applicant: Tianjin University, Tianjin (CN)

(72) Inventors: Gequn Shu, Tianjin (CN); Lingfeng Shi, Tianjin (CN); Hua Tian, Tianjin (CN); Guangdai Huang, Tianjin (CN); Xiaoya Li, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/739,760

(22) PCT Filed: Jul. 24, 2015

(86) PCT No.: PCT/CN2015/085081
§ 371 (c)(1),
(2) Date: Dec. 25, 2017

(87) PCT Pub. No.: WO2017/012130
PCT Pub. Date: Jan. 26, 2017

(65) Prior Publication Data
US 2018/0187549 A1 Jul. 5, 2018

(30) Foreign Application Priority Data
Jul. 21, 2015 (CN) .......................... 2015 1 0434392

(51) Int. Cl.
*F01C 1/344* (2006.01)
*F01C 21/18* (2006.01)
(Continued)

(52) U.S. Cl.
CPC ............ *F01C 1/3446* (2013.01); *F01C 21/18* (2013.01); *F01C 1/3445* (2013.01);
(Continued)

(58) Field of Classification Search
CPC .......... F01C 1/3446; F01C 21/18; F04C 2/22; F04C 11/001; F04C 28/22; B60T 17/001; F02G 5/04
See application file for complete search history.

(56) References Cited

U.S. PATENT DOCUMENTS 3,549,289 A * 12/1970 Skagen ................. F01C 1/3446
418/239
3,699,683 A * 10/1972 Tourtellotte ......... B01D 53/944
60/274
(Continued)

FOREIGN PATENT DOCUMENTS

CN 1363760 A 8/2002
CN 101504231 A 8/2009
(Continued)

*Primary Examiner* — Deming Wan
(74) *Attorney, Agent, or Firm* — George G. Wang; Bei & Ocean

(57) ABSTRACT

Single expander device working with two working media in a two-stage organic Rankine cycle, which has a cylinder body, a rotor disposed inside the cylinder body and provided with a number of slip sheets in a radial direction of the cylinder body, and a rotary shaft fixedly connected to the center of the rotor, with the outer profile of the cylinder body defined by two mathematical equations.

4 Claims, 2 Drawing Sheets

(51) Int. Cl.
  *F04C 2/22* (2006.01)
  *F02B 55/14* (2006.01)
  *F01C 1/44* (2006.01)
  *F04C 11/00* (2006.01)
  *B60T 17/02* (2006.01)
  *F04C 28/22* (2006.01)
  *F02G 5/04* (2006.01)
  *F02G 5/02* (2006.01)
  *F02G 1/053* (2006.01)

(52) U.S. Cl.
  CPC .............. *F02G 1/0535* (2013.01); *F02G 5/02* (2013.01); *F04C 2250/30* (2013.01); *Y02T 10/166* (2013.01)

(56) References Cited

U.S. PATENT DOCUMENTS

| | | | | |
|---|---|---|---|---|
| 4,009,573 A | * | 3/1977 | Satz | F02G 1/043 418/13 |
| 4,088,426 A | | 5/1978 | Edwards | |
| 4,357,800 A | * | 11/1982 | Hecker | F01C 11/004 418/29 |
| 4,410,305 A | * | 10/1983 | Shank | F01C 21/106 418/150 |
| 4,589,829 A | * | 5/1986 | Ogawa | B60T 17/02 418/259 |
| 6,245,254 B1 | * | 6/2001 | Corr | C09K 5/045 252/68 |
| 2004/0060292 A1 | * | 4/2004 | Minemi | F01B 17/04 60/616 |

FOREIGN PATENT DOCUMENTS

| | | |
|---|---|---|
| CN | 104131843 A | 10/2009 |
| CN | 102278197 A | 12/2011 |
| CN | 104564161 A | 4/2015 |
| DE | 3200578 A1 | 7/1983 |
| DE | 3718551 A1 | 12/1988 |
| JP | 2008255927 A | 10/2008 |

\* cited by examiner

DOUBLE-WORKING-MEDIUM EXPANDER USED FOR TWO-STAGE ORGANIC RANKINE CYCLE

TECHNICAL FIELD

The present invention relates to a fluid expander, in particular to a double-working-medium expander used for a two-stage organic Rankine cycle by using waste heat of an internal combustion engine (hereinafter referred to as IC engine).

BACKGROUND OF THE PRESENT INVENTION

For waste heat recovery of an internal combustion engine, the organic Rankine cycle becomes one of main recovery technologies due to its advantages of high efficiency, high adaptability, stable operation and the like. In order to further improve the recovery efficiency of exhaust gas and engine coolant, two-stage organic Rankine cycle is adopted as an effective way in the IC engine, Which uses a high-temperature organic Rankine cycle to adapt to waste heat of high-grade exhaust gas and uses low-temperature organic Rankine cycle to adapt the low-grade engine coolant. In the two-stage organic Rankine cycle, both the high-temperature-cycle and the low-temperature cycle require expansion devices to convert fluid energy into mechanical work, that is, the two-stage organic Rankine cycle has a high-temperature expander and a low-temperature expander. Since automotive IC engine is the most common type of IC engine, miniaturization and light weight become important requirements for the recovery device. Furthermore, each expander requires a set of expander auxiliary systems such as lubricating systems, sealing systems, cooling systems, transmission systems, which greatly increases the complexity of the equipment and is not good for the miniaturization and light weight of the equipment. Therefore, it is necessary to propose an expansion mechanism for realizing expansion work processes of different high-temperature and low-temperature working mediums. This expansion mechanism may be referred to as a double-working-medium expander. On one hand, the double-working-medium expander of the present invention performs expansion work with different working mediums in an expansion machine, so that only one set of expander auxiliary systems such as a lubricating system, a sealing system, a cooling system, a transmission system and the like is required, and it is advantageous for the miniaturization and light weight of the device. On the other hand, high-temperature and low-temperature expansion effects can be complementary with each other, when the power generation is insufficient in one of the high-temperature and low-temperature expansion processes under particular working conditions, the output power can be still driven by the other one.

SUMMARY OF THE PRESENT INVENTION

The present invention is to provide a double-working-medium expander used for a two-stage organic Rankine cycle, which can integrate a high-temperature expander and a low-temperature expander in a two-stage organic Rankine cycle system as a whole.

The present invention employs the following technical solutions. A double-working-medium expander used for a two-stage organic Rankine cycle is provided, including a cylinder body, a rotor disposed inside the cylinder body and provided with a plurality of slip sheets in a radial direction of the cylinder body, and a rotary shaft fixedly connected to the center of the rotor, wherein the cylinder body is of an annular structure formed by two semi-oval structures which are in butt joint with unequal semi-major axes and equal semi-minor axes; the outer peripheral surface of the rotor can be rotationally tangent to the inner peripheral surface of the cylinder body at the butt joint position of the two semi-oval structures of the cylinder body; a low-temperature cycle volume for expanding the low-temperature working medium with a large flow and a small expansion ratio and a high-temperature cycle volume for expanding the high-temperature working medium with a small flow and a large expansion ratio are formed among two sides of the rotor and the cylinder body, respectively; and, a first fluid inlet and a first fluid outlet, which are arranged on the cylinder body wall, are communicated with the low-temperature cycle volume, and a second fluid inlet and a second fluid outlet, which are arranged on the cylinder body wall, are both communicated with the high-temperature cycle volume.

The rotor and the rotary shaft are fixedly connected to each other by a key structure.

A plurality of slide slots are formed on the rotor along the radial direction of the rotor, openings of the slide slots are located on the peripheral wall of the rotor, and the slip sheets can be inserted into the slide slots along the radial direction in a freely sliding manner.

Profile equations of the two semi-oval structures are respectively as follows:

$$\rho = \frac{r_1}{\sqrt{\left(\frac{r_1}{R_1}\right)^2 \sin^2 \Phi + \cos^2 \Phi}} \text{ and } \rho = \frac{r_2}{\sqrt{\left(\frac{r_2}{R_2}\right)^2 \sin^2 \Phi + \cos^2 \Phi}},$$

where $\rho$ is a radius vector of a curve, $\phi$ is a coordinate polar angle of the radius vector, $r_1$ and $r_2$ are major radii of the arc portions, and $R_1$ and $R_2$ are minor radii of the arc portions, respectively.

The diameters of the first fluid inlet and the second fluid inlet are proportional to the flow values of the working medium entering the low-temperature cycle volume and the high-temperature cycle volume.

The double-working-medium expander used for a two-stage organic Rankine cycle provided by the present invention integrates a high-temperature expander and a low-temperature expander in a two-stage organic Rankine cycle as a whole, and only requires one set of expander auxiliary systems such as a lubricating system, a sealing system, a cooling system and a transmission system; the present invention applies a slip-sheet expander to make two working mediums expanding simultaneously in a same device, so that the traditional expander having two expanders and two sets of auxiliary systems can be avoided. Consequently, the cycle components can be effectively spatial arranged, the weight of a waste heat recovery device can be reduced, and the fuel consumption by the device weight can be reduced. In the present invention, two working mediums in the two-stage organic Rankine cycle can do expansion work in an expansion mechanism, which is advantageous for the miniaturization and light weight of the device.

BRIEF DESCRIPTION OF THE DRAWINGS

FIG. 4 is an overall structural diagram of a rotor according to the present invention; in which:

1: rotor; 2: cylinder body;
3: slide slot; 4: slip sheet;
5: rotary shaft; 6: low-temperature cycle volume;
7: high-temperature cycle volume; 8: first fluid inlet;
9: first fluid outlet; 10: second fluid inlet;
11: second fluid outlet; and, 12: key structure.

DETAILED DESCRIPTION OF THE PRESENT INVENTION

The double-working-medium expander used for a two-stage organic Rankine cycle of the present invention will be described below in detail by embodiments with reference to the accompanying drawings.

Figure 1:
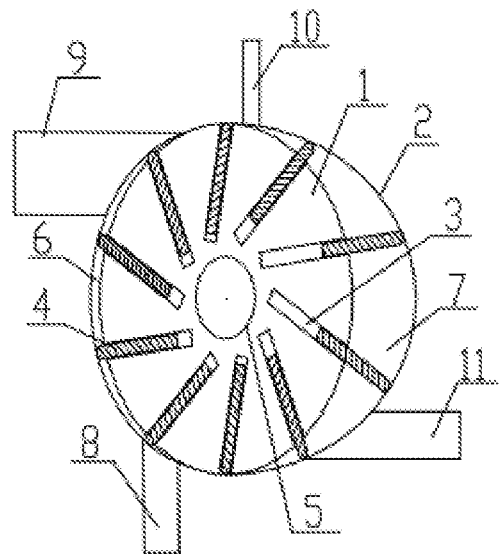
FIG. 1 is an overall structural diagram of a double-working-medium expander according to the present invention.
Figure 2:
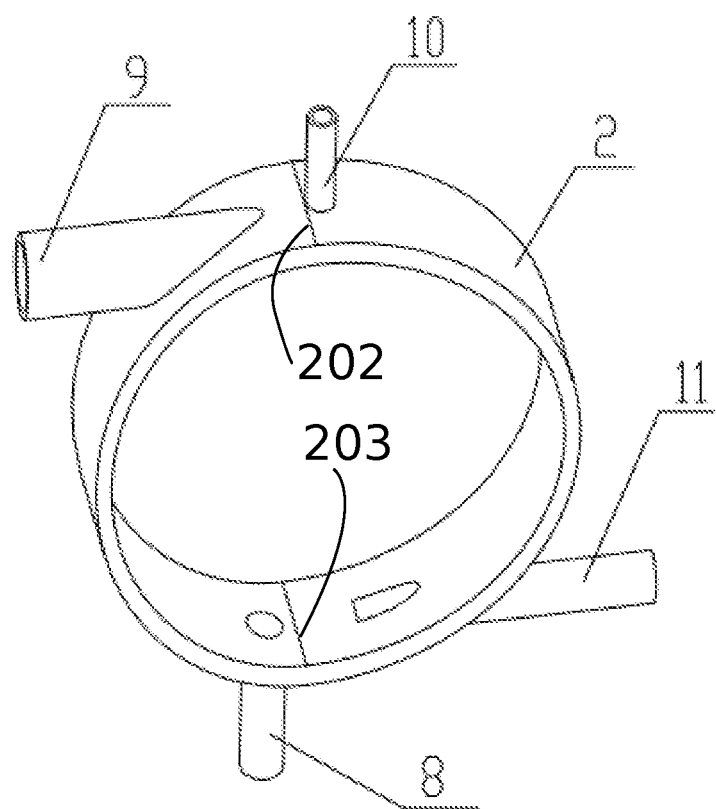
FIG. 2 is an overall structural diagram of a cylinder body according to the present invention.
Figure 3:
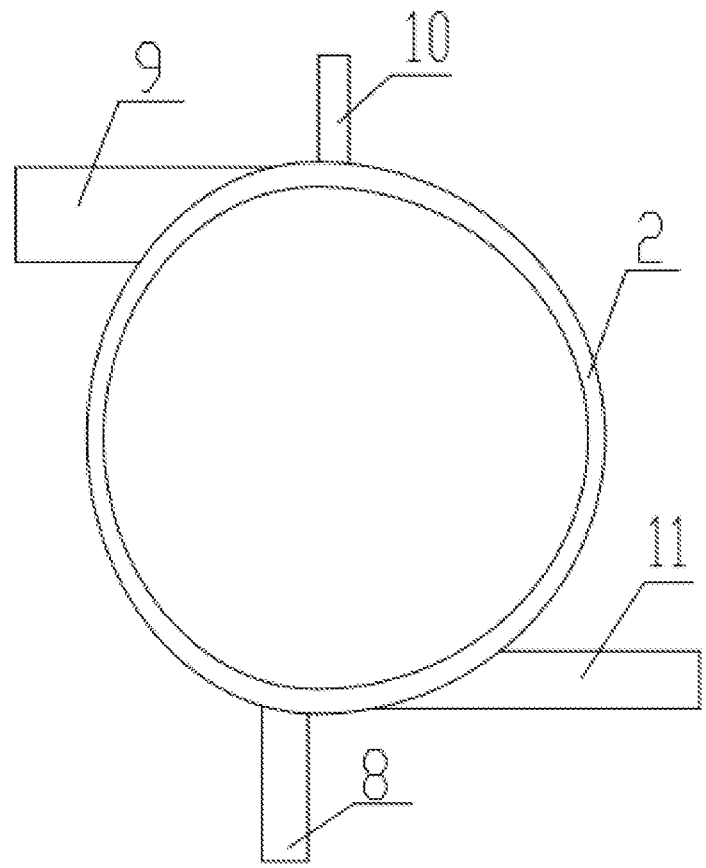
FIG. 3 is a front structural diagram of the cylinder body according to the present invention.

As shown in FIGS. 1, 2 and 3, the double-working-medium expander used for a two-stage organic Rankine cycle of the present invention comprises a cylinder body 2, a rotor 1 disposed inside the cylinder body 2 and provided with a plurality of slip sheets 4 in a radial direction of the cylinder body 2, and a rotary shaft 5 fixedly connected to the center of the rotor 1, and the rotor 1 and the rotary shaft 5 are fixedly connected to each other by a key structure 12. In particular, the cylinder body 2 is of an annular structure formed by two semi-oval structures which are in butt joint 202, 203 with unequal semi-major axes and equal semi-minor axes. Profile equations of the two semi-oval structures are respectively as follows:

$$\rho = \frac{r_1}{\sqrt{\left(\frac{r_1}{R_1}\right)^2 \sin^2 \Phi + \cos^2 \Phi}} \text{ and } \rho = \frac{r_2}{\sqrt{\left(\frac{r_2}{R_2}\right)^2 \sin^2 \Phi + \cos^2 \Phi}},$$

Wherein, $\rho$ is a radius vector of a curve, $\phi$ is a coordinate polar angle of the radius vector, $r_1$ and $r_2$ are major radii of the arc portions, and $R_1$ and $R_2$ are minor radii of the arc portions, respectively.

The outer peripheral surface of the rotor 1 can be rotationally tangent to the inner peripheral surface of the cylinder body 2 at the butt joint position of the two semi-oval structures of the cylinder body 2; a crescent-shaped low-temperature cycle volume 6 for expanding the low-temperature working medium with a large flow and a small expansion ratio and a crescent-shaped high-temperature cycle volume 7 for expanding the high-temperature working medium with a small flow and a large expansion ratio are formed among two sides of the rotor 1 and the cylinder body 2, respectively; and, a first fluid inlet 8 and a first fluid outlet 9, which are arranged on the wall of the cylinder body 2, are communicated with the low-temperature cycle volume 6, and a second fluid inlet 10 and a second fluid outlet 11, which are arranged on the wall of the cylinder body 2, are both communicated with the high-temperature cycle volume 7. The diameters of the first fluid inlet 8 and the second fluid inlet 10 are proportional to the flow values of the working medium entering the low-temperature cycle volume 6 and the high-temperature cycle volume 7. In the low-temperature cycle volume 6 and the high-temperature cycle volume 7, the high-temperature cycle volume 7 having a large volume change rate adapts to fluid having a large expansion ratio, while the low-temperature cycle volume 6 having a small volume change rate adapts to fluid having a small expansion ratio.

In a preferred working medium combination of the two-stage organic Rankine cycle, the high-temperature working medium (e.g., methylbenzene) has the characteristics of small flow and large expansion ratio, while the low-temperature working medium (e.g., R143a) has the characteristics of large flow and small expansion ratio. Therefore, the high-temperature working medium enters the second fluid inlet 10 for volume expanding, and then is discharged from the second fluid inlet 11, and the low-temperature working medium enters the first fluid inlet 8 for volume expanding, and is discharged from the first fluid outlet 9.

Figure 4:
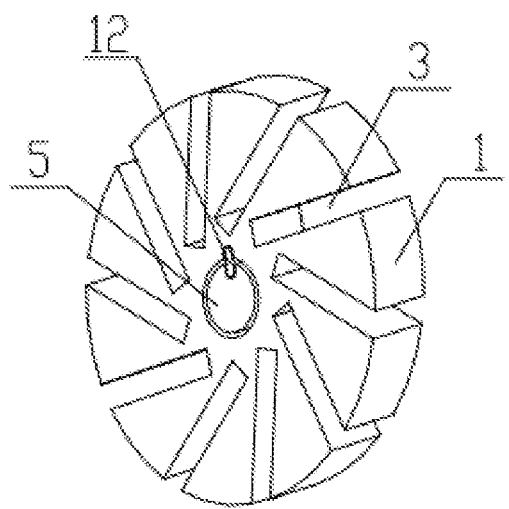

As shown in FIG. 4, a plurality of slide slots 3 are formed on the rotor 1 along the radial direction of the rotor, openings of the slide slots 3 are located on the peripheral wall of the rotor 1, and the slip sheets 4 can be inserted into the slide slots 3 along the radial direction in a freely sliding manner. During the rotation of the rotor 1, the slip sheets 4 are thrown out from the slide slots 3 due to a centrifugal force, and the ends of the slip sheets 4 are closely attached onto the inner surface of the cylinder body 2 so as to divide the crescent-shaped space into a plurality of sector-shaped small volumes.

As the double-working-medium expander, the present invention integrates a high-temperature expander and a low-temperature expander in a two-stage organic Rankine cycle as a whole, and only requires one set of expander auxiliary systems such as a lubricating system, a sealing system, a cooling system and a transmission system; the present invention applies a slip-sheet expander to make two working mediums expanding simultaneously in a same device, so that the traditional expander having two expanders and two sets of auxiliary systems can be avoided. Consequently, the recycling components can be effectively spatial arranged, the weight of a waste heat recovery device can be reduced, and the fuel consumption of the recovery device can be reduced. In the present invention, two working mediums in the two-stage organic Rankine cycle can do expansion work in an expansion mechanism, which is advantageous for the miniaturization and light weight of the device.

As a double-working-medium expansion device, the present invention may be specifically used in the two-stage organic Rankine cycle of a portable IC engine. In the case of the portable internal combustion engine having a limited space for a waste heat device, the present invention integrates the high-temperature and low-temperature expansion devices as a whole, and only requires one set of expander auxiliary systems such as a lubricating system, a sealing system, a cooling system and a transmission system, so that the traditional expander having two expanders and two sets of auxiliary systems can be avoided. Consequently, the cycle components can be effectively spatial arranged, the weight of a waste heat recovery device can be reduced, and the fuel consumption by the device weight can be reduced. For example, for a diesel engine having a heat source temperature of 470° C., a pair of high-temperature working medium and low-temperature working medium having good performance includes methylbenzene/R143a, and cyclohexane/R143a and the like, where the high-temperature working medium has the characteristics of small flow and large expansion ratio while the low-temperature working medium has the characteristics of large flow and small expansion ratio. In the present invention, different profile designs on two sides of the cylinder body and the design of two pairs of different inlet and outlet can well adapt to these characteristics, and the two working mediums can do expansion work in a same expansion device.

We claim:

1. A portable internal combustion engine, comprising a double-working-medium expander miniaturized for being disposed inside the engine and used for a two-stage organic Rankine cycle, said double-working-medium expander comprising two asymmetrical oval halves which are unequal in major axis but equal in minor axis to accommodate a low-temperature cycle volume (6) and a high-temperature cycle volume (7), respectively, a first fluid inlet (8) and a first fluid outlet (9), which are communicated with the low-temperature cycle volume (6) for expanding a low-temperature working medium with a large flow and a small expansion ratio, and a second fluid inlet (10) and a second fluid outlet (11), which are communicated with the high-temperature cycle volume (7) for expanding a high-temperature working medium with a small flow and a large expansion ratio, wherein the portable internal combustion engine is a diesel engine and has a temperature of 470° C. for the high-temperature working medium and the high-temperature working medium and low-temperature working medium are methylbenzene and R143a respectively, or cyclohexane and R143a respectively.

2. The portable internal combustion engine according to claim 1, wherein the double-working-medium expander comprises a rotor (1) and a rotary shaft (5) which are fixedly connected to each other by a key structure (12).

3. The portable internal combustion engine according to claim 1, wherein the double-working-medium expander comprises a plurality of slide slots (3) and a plurality of slip sheets (4) with the slide slots formed on the rotor (1) along the radial direction, into which the slip sheets (4) can be inserted along the radial direction in a freely sliding manner.

4. The portable internal combustion engine according to claim 1, wherein the double-working-medium expander used for the two-stage organic Rankine cycle according to the claim 1, wherein the diameters of the first fluid inlet (8) and the second fluid inlet (10) are proportional to the flow values of the working medium entering the low-temperature-stage cycle volume (6) and the high-temperature-stage cycle volume (7).

* * * * *